July 2, 1940.   G. SLAYTER ET AL   2,206,058
MANUFACTURE OF GLASS WOOL
Filed Oct. 23, 1936   2 Sheets-Sheet 1
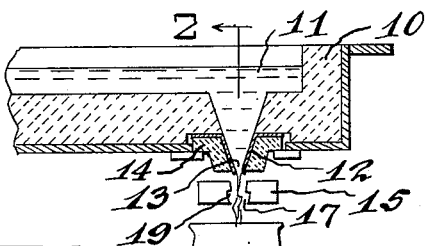
FIG-1-
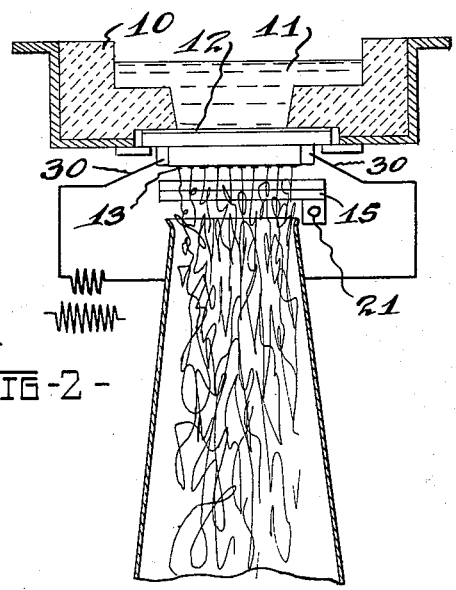
FIG-2-
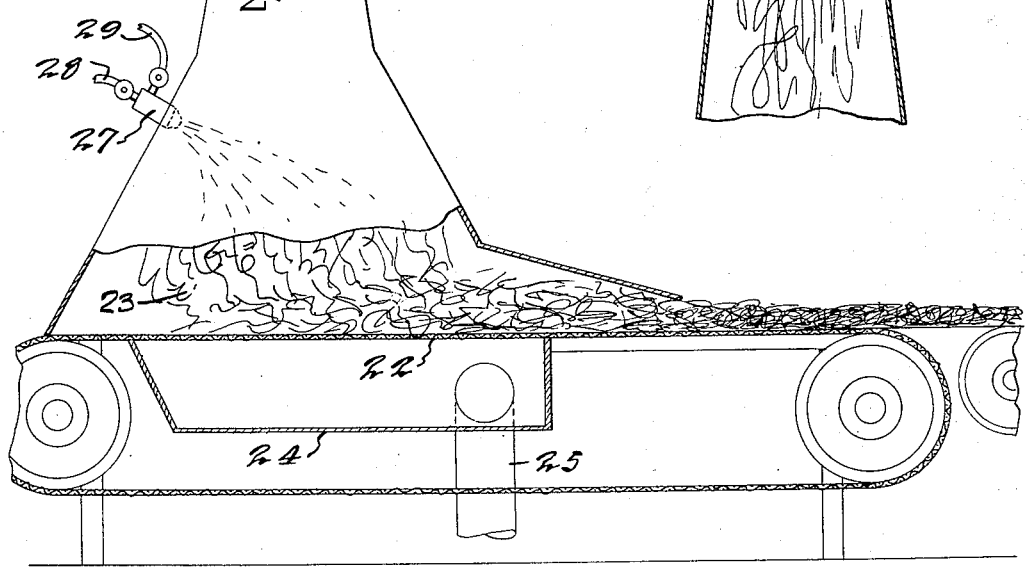
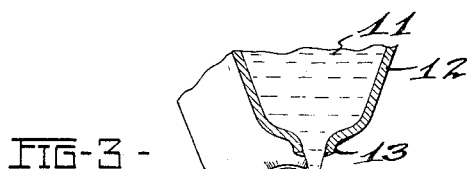
FIG-3-
James Slayter
John H. Thomas
INVENTORS
BY Rule & Hoge
ATTORNEYS July 2, 1940.   G. SLAYTER ET AL   2,206,058
MANUFACTURE OF GLASS WOOL
Filed Oct. 23, 1936   2 Sheets-Sheet 2
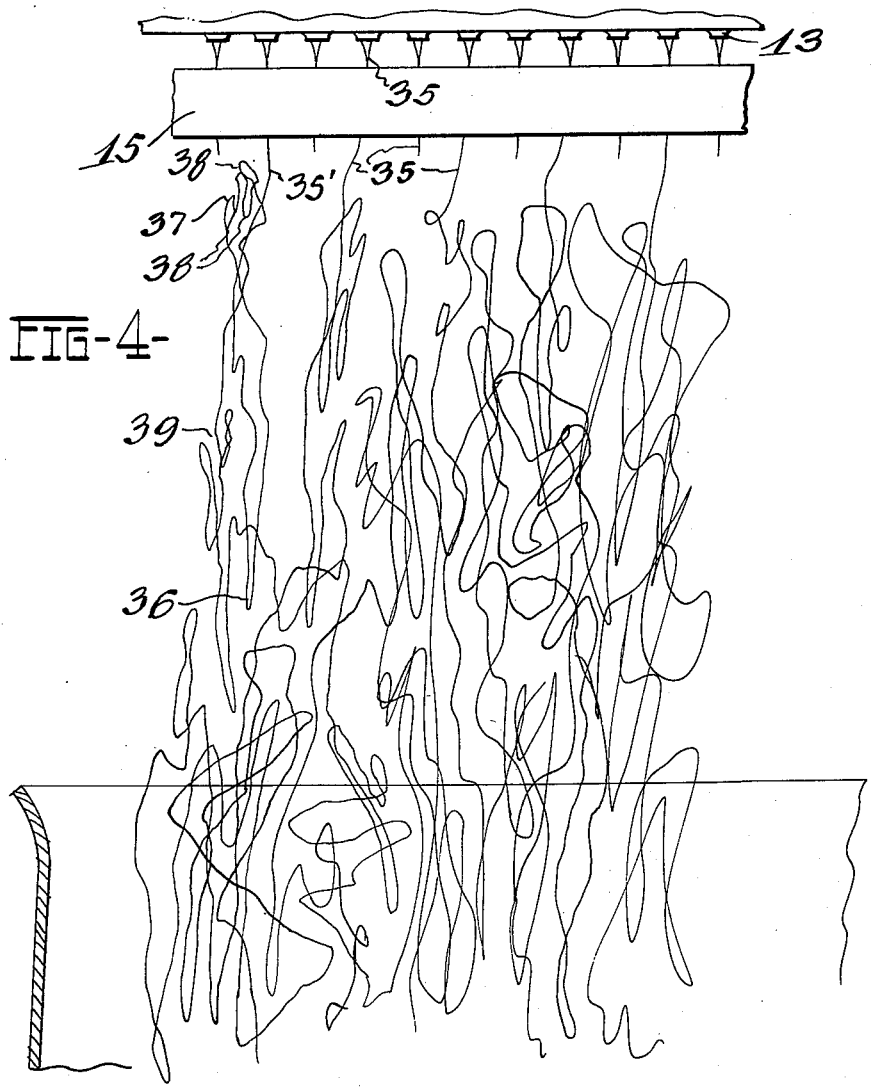
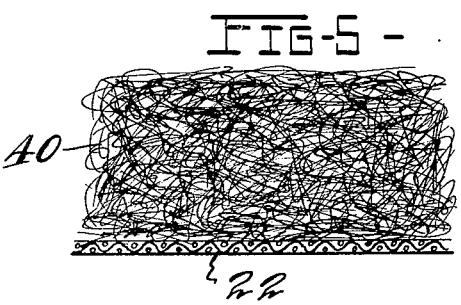
James Slayter
John H. Thomas
INVENTORS
BY Rule & Hoge
ATTORNEYS Patented July 2, 1940

2,206,058

UNITED STATES PATENT OFFICE 2,206,058

MANUFACTURE OF GLASS WOOL

Games Slayter and John H. Thomas, Newark, Ohio, assignors, by mesne assignments, to Owens-Corning Fiberglas Corporation, a corporation of Delaware Application October 23, 1936, Serial No. 107,128

7 Claims. (Cl. 49—77)

The present invention relates to improvements in the method of producing glass wool and to a novel method of forming interfelted mats thereof having certain novel characteristics.

The present application is filed as a continuation in part of applicants' co-pending application, Serial Number 704,028, filed December 26, 1933, now Patent No. 2,133,236, in which a multiplicity of streams of glass are fed downwardly through concurrently flowing steam or high pressure gas blasts which attenuate the glass streams into long continuous fine glass fibers. These fibers are then permitted to collect upon a traveling belt where they build themselves up into a mat or bat. The present application is directed to certain improvements in the method of this prior application.

It is an object of the present invention to provide a method for producing glass wool at a rate of production a great many times higher than was known or thought possible heretofore.

It is also an object of the present invention to provide a method of forming glass fibers and causing them simultaneously to entangle and interfelt with each other in such a manner that they form a mat in which the fibers are not all lying substantially in a plane parallel to the face of the mat but, on the contrary, are interfelted with the individual fibers running haphazardly throughout the mat in all directions.

It is another object of the present invention to provide a method of producing glass wool having long, fine fibers and a very low percentage of slugs.

A further object of the invention is to provide an arrangement of gas blasts which grab the individual glass streams and efficiently attenuate them into fibrous glass to the end that the consumption of steam is exceedingly low in comparison to the amount of wool produced.

Other objects and advantages of the present invention will become apparent from the following description taken in conjunction with the drawings, in which:

Fig. 1 is a cross-section elevational view of an apparatus for producing glass wool and forming it into a felted mass;

Fig. 2 is a cross-sectional elevational view of the same apparatus, the section being taken along line 2—2 of Fig. 1;

Fig. 3 is a fragmentary sectional view of the glass stream feeder and the blower illustrating the method of fiber production made possible by the present invention;

Fig. 4 is a fragmentary side elevation view of a few streams of glass being attenuated by the whipping action, these fibers being a partial reproduction of a spark photograph of an actual operation; and Fig. 5 is a more or less diagrammatic elevational view of a mat formed by means of the present invention.

A primary feature of the invention is the manner of whipping the individual streams of glass during the formative stage of the fibers to the end that the streams are simultaneously attenuated at a multiplicity of points and in a multiplicity of directions to cause a total attenuation vastly greater than if the streams were merely attenuated in one direction concurrently with the steam blast. As a further result of this so-called whipping action, we have been enabled to form a mat having distinctly new and beneficial characteristics.

Heretofore mats formed of long glass fibers were more on the order of webs in which practically all the fibers, in being fed onto the forming surface or belt, assumed parallelism with this surface. As these long fibers were laid onto the surface they were woven back and forth, lying one on top of another, to produce a laminated mat.

On the other hand, the present invention comprises a novel method wherein as a result of the whipping action of the fibers, they take a zig-zag path and are deposited irregularly in such manner that there is a more perfect interlacing and a true felting of the fibers which, instead of lying parallel to the face of the mat, are woven up and down to a large extent. Moreover, when a multiplicity of streams are simultaneously and proximately whipped together into fibers, the fibers intertangle and interlace to a large extent before being arrested by the forming surface. This materially assists in forming a felted mass in which the fibers have departed from uniform parallelism with the major face of the mat. A further feature of the whipping action is the formation of curled or bent fibers, this being caused by the freezing of the glass streams into fibrous form at a time when the stream has been momentarily bent into an irregular shape by the whipping action. These curled or bent fibers also materially assist in producing a felted mass in which a large portion of the fibers have departed from the usual inherent parallelism to the face of the mat.

Referring more particularly to the drawings, reference character 10 designates a conventional glass furnace or melter in which a supply body 11 of molten glass is contained. In the floor of the furnace 10 is a metal bushing or feeder 12 which is preferably downwardly convergent and has at the lower extremity a series of nipples 13. In order to produce fine fibers, we have found it desirable to feed glass through relatively small cross-sectional areas of the nipples 13. For example, exceedingly fine fibers ranging in the order of magnitude of about .01 to .0001 inch, may be drawn from nipple openings having diameters of about .150 to .02 inches, these figures being subject to variations in accordance with particular degrees of attenuation, speeds of production and the type of fiber which it is desired to produce.

The feeder 12 is preferably composed of a high melting metal or alloy, such as platinum or platinum-rhodium alloy. However, steel alloys, refractories, other suitable materials, or the like, may also be used for low melting glasses, provided the glass be sufficiently fluid to be attenuated in accordance with the present invention. The metal composing the nipples 13 may be wetted by molten glass so as to feed definite amounts from the supply body.

Surrounding the feeder 12 and supporting it is a refractory bushing 14 below which the nipples 13 preferably project a short distance.

At opposite ends of the feeder 12 are electrical connections 30 (Fig. 2) which introduce an adjustable quantity of electricity to regulably heat or melt the glass within the feeder. It is possible to effect all the heating and melting within the feeder 12 and so eliminate the conventional ceramic furnace 10. However, it has been found preferable to form the molten glass from batch in a ceramic furnace and supply the glass through the feeder which maintains it at the proper temperature as it is discharged.

Spaced below the nipples a short distance is a blower 15 which is provided with a conduit 21 (Fig. 2) through which steam or other high pressure gas is admitted. The steam blower is preferably formed with two rows of nozzles or jets 19 which face each other a short distance apart on each side of a slot 17 through which the streams of glass are fed. The angle of direction of these nozzles is about 12° with the vertical, or an included angle of 24°, this angle being great enough to grab the glass streams and cause their attenuation without sacrificing the speed of the blast. The individual nozzles lining each side of the slot 17 are preferably paired off and indexed directly opposite each other to the end that the blasts issuing from each pair of oppositely facing jets intersect and conflow to form a row of single blasts. The space existing between the adjacent blasts along the slot 17 has been termed a "hole" in view of the absence or at least minimization of the blast at these points. The presence of these holes is of considerable importance as brought out more fully hereinafter.

Below the blower is a receiving hood 20 into which the blasts and the fibers are directed. The hood 20 is preferably diverging to form a venturi throat which serves to expand the vehicular blasts and cause their deceleration. At the bottom of the hood is a traveling conveyor belt 22 upon which the fibers 23 are arrested and collected. The belt 22 is preferably foraminous to permit the passage of the vehicular blast therethrough into a chamber 24 from where the gases are led off through a conduit 25. Suction means may be applied to the chamber 24 to assist in the formation of the mat and the discharge of the vehicular blasts. At the back end of the hood 20 is a spray gun 27 which serves to spray the glass felt 23 with suitable lubricants or binders. Conduits 28 and 29 may be provided to introduce high pressure air and suitable sizing, binding or coating materials to the spray gun 27.

An important feature of the present invention is the novel method of attenuating the streams of glass. We have found that by properly combining an open steam blast with the proper temperature condition, viscosity and speed of feeding of the glass stream, it is possible to sharply flutter or whip the glass streams and attenuate them simultaneously along their length at a multiplicity of points and in many directions to produce an ultimate attenuation vastly greater than if the stream were pulled straight down by the steam blast. An increase in fiber production is also made possible by the present invention which may be as high as about eight or twelve times as that obtained by straight pulling.

It has been found preferable in the practice of the present invention to provide a steam blast which is incompletely expanded. To produce this the steam may be discharged through straight sided nozzles or jets. As the blasts leave the nozzles the steam continues to expand and have a lateral component of movement. Moreover, the velocity of the steam at various points along a cross-section of the blast is different. The velocity in the center of the blast is in general considerably higher than the velocity of the blast at the outer margin or fringe. This differential of speed and the lateral expanding movement of the steam serves to produce a whipping action of the glass fibers as brought out more fully hereinafter.

Another factor assisting in the effective attenuation of glass streams and tending to minimize, if not completely eliminate the formation of slugs, is the induction of surrounding atmospheric gases into the steam blast. The induced gases assist the glass streams in entering in and being grabbed by the blast itself. Without this induction of atmospheric gases into the blast, the glass may tend to ride on the blast without penetrating it, this condition causing an accumulation of molten glass on top of the blast until a sufficient body of glass has accumulated or until it has become sufficiently cool and rigid to pierce the blast. When it finally does pierce the blast in this manner, however, it is in the form of a slug or shot which is merely thrown out without being fully attenuated into a fiber.

In order to permit the induction of a large amount of air into the blasts from over the blower, the spacing between the adjacent individual jets is made sufficiently large to cause what we have termed holes between the adjacent blasts. Into these holes is drawn a large portion of the surrounding atmospheric gases with the result that the glass streams may immediately and continuously enter the high pressure blast without any difficulty.

We will now describe the whipping action and the theory behind the causes and effects thereof. When a molten stream of glass enters into the steam blast, it is yieldingly although rapidly attenuated so that it quickly attains a velocity approximating that of the steam blast itself. As the stream then proceeds further down into the blast, there is a tendency for portions of it to move laterally and enter into a lower velocity steam blast region. This lateral movement is probably enhanced by the expanding nature of the steam blast itself and also by the inherent turbulence of the steam. Other portions of the glass stream, however, tend to remain in the high speed regions and actually pass the first mentioned portion which had entered into the lower speed region. A loop or zig-zag is now present in the glass stream. As this loop is then further attenuated, it will be noted that the glass stream is simultaneously being attenuated on each side of the loop so that a double attenuation is achieved. Instead of having a single loop, however, with merely a double attenuation, it is possible to have a high number of loops, with a consequent multiplication of the attenuation. Moreover, the loops do not remain in a simple formation but are formed in all directions and at many places along the fiber length simultaneously. The result is that the stream is attenuated substantially uniformly throughout its length.

The turbulence of the steam and the degree of whipping may actually be so high as to pull portions of the stream to extreme fineness or nothingness, thus causing a severance in the stream. However, because of the original small diameter of the stream, it is not atomized or caused to branch into a multiplicity of shorter fibers, in which case each fiber would have a slug attached thereto as is common in the conventional method of atomizing slag into mineral wool. On the contrary, each portion of the glass stream along its length yields but one portion of a fiber even though the stream may actually be pulled apart along its length into a series of fine fibers.

In order for the whipping action to be attained we have found that several conditions are necessary. Not only should the steam blast be of the nature mentioned hereinabove but also the glass stream itself should be sufficiently fluid and hot that the glass will be feed into the blast at a high enough rate to provide for the total attenuation. That is to say, a sufficient quantity of glass must be feed to produce the desired amount of glass wool with the ultimate fiber diameter.

From another point of view, the glass stream must be fed with sufficient rapidity to permit the stream to be attenuated and looped without causing it to be continually pulled to excessive fineness and severed.

Moreover, the glass must be sufficiently hot that it will remain plastic throughout the whipping range which exists for some inches below the blower. If the glass is fed too cool into the blast, the latter will chill and freeze the glass so that any further pulling or whipping will not cause an attenuation. In practice it has been found that a temperature in the range of about 2300° F. to about 2700° F. is desirable for ordinary lime glasses. This temperature, it will be noted, is in proximity to the devitrification point of these glasses. Lower temperatures, of course, may be used with lower melting glasses such as lead glasses. The higher the temperature within reasonable limits, the greater will be the effective attenuation due to whipping.

This action may be observed by referring to Fig. 4 which is a partial reproduction of a spark photograph illustrating the whipping action. For the sake of clarity, only a few of the fibers have been shown in the whipping range, but it will be understood that it is possible and preferable to produce a large number of these fibers in close proximity to and simultaneously with one another. In Fig. 4 molten streams 35 flow from the small outlet orifices or nipples 13 into the blasts issuing from the spaced jets in the blower 15. One stream 35' only will be described. As the stream 35' strikes the blasts, a portion of it is pulled downwardly into a loop 36. A succeeding portion 37 of the same stream, however, may not be influenced in the same degree by the blast but tends to remain in a more quiescent state for an infinitesimal fraction of a second near the blower. As the loop 36 is further attenuated, the stream on both sides thereof is being drawn into a fine fiber. Simultaneously with the attenuation of the loop 36, may be the formation of a series of loops 38, and of another large loop 39, all of which are pulled to cause an exceedingly high degree of attenuation. This condition, it will be noted, is carried on throughout the whipping range and with all of the streams simultaneously.

Not only are the individual streams attenuated by means of the whipping action, but also they are commingled and entangled thereby. The loops and lateral movements in the streams tend to bring about a much more complete jumbling up of the fiber formation after they have been deposited on the belt 22 (Fig. 5).

In regard to the phenominal increase in speed of production made possible by the present invention, a specific example may be referred to as follows. In this test a standard bushing with 28 nipple openings of .080" diameter was used and the blower was of the type described in which the jets were inclined at an included angle of about 24°.

Bushing temperature_____ 2550° F.
Steam temperature_____ 520° F.
Steam pressure_____ 150#/sq. in.
Theoretical speed of blast_____ 70,000 ft./min.
Wool production_____ 31 oz./min.
Average fiber diameter about_____ .00029 inch
Average fiber length_____ Many in. or ft.

The speed of the fibers cannot be determined accurately in view that it is ever changing, but it is evident that their speed must be something less than that of the steam blast which is attenuating the stream of glass. As a matter of fact, during the straight pull method, the fibers may attain a speed of about 90% to 95% of the speed of the steam blast. If, however, in the above example, the total length of fibers produced in unit time be computed from the wool production and average fiber diameter, it is possible to compute the theoretical speed of these fibers assuming that they were to issue continuously and uniformly from all of the nipple openings in a straight line. This theoretical speed is calculated to be about 841,000 feet per minute per fiber which is a speed about eleven times as fast as the actual speed of the blast which is pulling the fibers. Obviously then, the fibers are not being pulled as assumed in the calculation by means of a straight pull, but on the contrary are being whipped about and attenuated as shown in Fig. 4 on an average of about eleven places along its length all at the same time.

The above example is not intended to be a limitation of the present invention but merely an elucidation of the startling beneficial effect of the whipping action. Other temperatures and sizes may be used within limits as noted hereinabove. With smaller nipple openings, as for example, nipple openings having diameters of about .040 inch, a much higher production may be obtained than is possible with the straight pull method. The increase in production over the straight pull method may be as high as eight or twelve or even more times as experience has shown.

A felted mass produced by the practice of the present invention has been illustrated in Fig. 5. A large portion of the individual fibers as, for example, fibers 40, have been deposited on the mat in such a manner that they have been prevented from assuming the inherent parallelism with the arresting surface or belt 22. The advantages of a felt made in accordance with the present invention are manifold. The felt is more resilient and fluffy, which is an advantage when using it in the walls of a building or the like for heat or sound insulation. It also may be made to possess a much lighter density as, for example, less than about a pound per cubic foot, although, of course, the mat may be packed down to twelve or more pounds per cubic foot, as desired. Moreover, an interfelted mass possesses a mass integrity in all directions far superior to any glass mats or bats heretofore known or produced. The mass integrity exists not only in the direction of the face of the mat but also in the direction of its thickness. This is owing to the fact that the fibers forming our felt are both exceedingly long and well felted in all directions.

When conditions have been arranged so that the individual streams are being pulled apart to nothing at various intervals, it is possible to produce staple fiber length. For example, it is possible by raising the temperature of the molten stream to near the upper range mentioned hereinabove to produce fibers having an average length of a few inches, some of these being longer than others. In depositing these staple fibers upon the arresting surface 22 and forming them into a felted mass, the entanglement and turbulence caused by the whipping action enables these fibers to arrange themselves haphazardly as noted hereinabove. In examining the resulting felt, it will be noted that the longer fibers have a tendency to assume parallelism with the belt, although not at all completely, and that the shorter fibers seem to be distributed universally throughout the felt in all directions. A felt of this formation has the characteristic of being highly resilient in the direction of the thickness of the mat and also possesses a high mass integrity in this direction owing to the interlacing of the shorter fibers. We have found that these glass wool felted bats are excellently adapted for heat and sound insulation.

Modifications may be resorted to within the spirit and scope of the appended claims. For example, it has been found possible to attenuate and form into fibers not only glass but other thermoplastic substances and materials capable of assuming a semi-fluid or viscous condition and gradually increasing in viscosity and hardening when passed in stream formation, attenuated and cooled, such materials including glass, siliceous materials, molasses, sugar, sealing wax and other waxes, resins, rubber, etc. A high production of fibers and an interfelted mat of these fibers are made possible by means of applicants' novel whipping action method, the particular temperatures and conditions, of course, being regulated accordingly to produce the proper fluidity, whipping and cooling as brought out more fully hereinabove.

We claim:

1. The method of forming a fine glass fiber which comprises directing two jets of high pressure gases against each other at an acute angle to cause their confluence in a downward direction into one turbulent blast and in a manner to permit free induction of surrounding atmospheric gases, flowing an unbroken stream of molten glass downwardly into said blast in proximity to the point of confluence, maintaining the temperature and viscosity of the stream of molten glass at such a degree and the turbulence of the blast such that said stream is whipped about in a multiplicity of directions and simultaneously attenuated by said blast into a fine fiber, said blast being cooler than said glass to cause said stream to solidify after it has been attenuated to a predetermined degree.

2. The method of producing a multiplicity of long fine glass fibers which comprises directing two rows of spaced jets of high pressure gases against each other at an acute angle with the jets of one row directly opposite the respective jets of the other row and thereby causing the confluence of said jets into a series of turbulent blasts moving in a downward direction and which expand and decelerate as they travel beyond said point of confluence, introducing into said series of blasts in proximity to the line of confluence of said jets a plurality of streams of molten glass flowing in a downward direction, and maintaining the stream at a sufficiently low viscosity and high temperature to cause said streams to be whipped about in a multiplicity of directions and simultaneously attenuated by said blasts into fine long fibers as said blasts expand and decelerate, said blasts being cooler than said streams to cause the latter to solidify after having been attenuated to a predetermined degree.

3. The method of forming a felted mass of fine glass fibers which are dispersed throughout said felted mass in all directions, said method comprising directing two rows of spaced jets of high pressure gases against each other at an acute angle with the jets of one row directly opposite the respective jets of the other row and thereby causing the confluence of said jets into a series of turbulent blasts moving in a downward direction, introducing into said series of blasts in proximity to the line of confluence of said jets a plurality of downwardly flowing streams of molten glass, feeding said glass into said blasts with sufficient rapidity and at a sufficiently low viscosity and high temperature to cause said streams to be whipped about in a multiplicity of directions in a region spaced beyond said line of confluence and simultaneously be attenuated by said blasts into fine long fibers, said blasts being initially cooler than said streams to cause the latter to solidify after having been attenuated to a predetermined degree, conveying said fibers by means of the attenuating and turbulent blasts and thereby causing them to entangle and interlace one another, and arresting said fibers upon a foraminous surface and thereby permitting said vehicular blasts to pass through said surface and mat said fibers into a felted mass.

4. The method as claimed in claim 1 in which the jets of gases are incompletely expanded at the point of confluence.

5. The method of forming a fine glass fiber which comprises directing two jets of gases at high velocity against each other at an acute angle to cause their confluence in a downward direction into one turbulent blast and in a manner to permit free induction of surrounding atmospheric gases, flowing an unbroken stream of molten glass in a downward direction from a point above said point of confluence into said turbulent blast in proximity to the point of confluence, maintaining the temperature and viscosity of the stream of molten glass at such a degree and the turbulence of the blast such that different portions of said stream are whipped about in a multiplicity of directions in sinuous form, and the stream is simultaneously drawn thereby in different directions and the stream as a whole thereby attenuated and lengthened a higher degree than would take place if the stream were moved in a straight line at a rate of speed at which the blast of gas as whole is moving, said blast being cooler than said glass to cause said stream to solidify after it has been attenuated.

6. The method which comprises directing two jets of high pressure gases against each other at an acute angle to cause their confluence into one turbulent blast passing in a downward direction and in a manner to permit free induction of gases above and around said point of confluence, flowing an unbroken stream of molten glass downwardly from a point above said point of confluence and through a relatively quiet zone into said blast in proximity to the point of confluence, causing the stream while passing through said relatively quiet zone to be attenuated to a comparatively thin stream or filament of viscous material, maintaining the temperature and viscosity of the stream of molten glass at such a degree and the turbulence of the blast such that said stream is driven about in a multiplicity of directions and simultaneously further attenuated by said blast into fine fibrous form, said blast being cooler than said glass as it enters said blast to cause said stream to solidify after it has been further attenuated into said fine fibrous form.

7. The method which comprises directing two jets of high pressure gases against each other at an acute angle to cause their confluence into one turbulent blast passing in a downward direction and in a manner to permit free induction of gases above and around said point of confluence, flowing an unbroken stream of molten glass downwardly from a point above said point of confluence and through a relatively quiet zone into said blast in proximity to the point of confluence, causing the stream while passing through said relatively quiet zone to be attenuated to a comparatively thin stream or filament of viscous material, maintaining the temperature and viscosity of the stream of molten glass at such a degree and the turbulence of the blast such that said stream is driven about in a multiplicity of directions and simultaneously further attenuated by said blast into fine fibrous form, said blast being cooler than said glass as it enters said blast to cause said stream to solidify after it has been further attenuated into said fine fibrous form and each portion along the length of said stream is attenuated into but one length of fiber.

GAMES SLAYTER.
JOHN H. THOMAS.